United States Patent [19]
Abe et al.

[11] Patent Number: 5,868,567
[45] Date of Patent: Feb. 9, 1999

[54] HEATER FOR TOP PORTIONS OF CONTAINERS

[75] Inventors: Kazuo Abe; Michio Ueda, both of Tokushima, Japan

[73] Assignee: Shikoku Kakoki Co., Ltd., Tokushima, Japan

[21] Appl. No.: 880,509

[22] Filed: Jun. 23, 1997

[30] Foreign Application Priority Data

Jun. 24, 1996 [JP] Japan .................................. 8-162833

[51] Int. Cl.⁶ ........................................ B65B 51/20
[52] U.S. Cl. ............................................ 432/224; 53/477
[58] Field of Search ............................... 432/224; 53/477

[56] References Cited

U.S. PATENT DOCUMENTS

| | | | |
|---|---|---|---|
| 4,035,987 | 7/1977 | Nakazato et al. | 53/133 |
| 4,838,009 | 6/1989 | Connor et al. | 53/477 |
| 5,618,253 | 4/1997 | Okushita | 53/477 |
| 5,678,391 | 10/1997 | Andersen et al. | 53/477 |

*Primary Examiner*—Teresa J. Walberg
*Assistant Examiner*—Gregory A. Wilson
*Attorney, Agent, or Firm*—Armstrong, Westerman, Hattori, McLeland & Naughton

[57] ABSTRACT

A heater for top portions of containers 11 filled with contents and each having a top forming tubular portion 14 generally rectangular to square in cross section for heating seal parts 31, 35 of the top forming portion 14 with hot air for heat-sealing comprises a hot air nozzle 51 in the form of a bottomed tube having a generally rectangular to square cross section and to be inserted into the top forming portion 14 for heating. The hot air nozzle 51 having first to fourth four side walls 61 to 64 integral with one another with a ridgeline formed between the adjoining side walls. The side walls 61 to 64 is formed with orifices 68 as distributed over regions thereof corresponding to the respective seal parts 31, 35. The side walls 61 to 64 each have an outer surface facing obliquely upward.

4 Claims, 4 Drawing Sheets

HEATER FOR TOP PORTIONS OF CONTAINERS

BACKGROUND OF THE INVENTION

The present invention relates to a heater for top portions of containers, and more particularly to a heater for containers each having an open upper end and filled with contents such as milk for use in folding the top portions of the containers to the shape of a gabled roof and heat-sealing the top portions.

FIG. 5 shows such a heater already known for use with containers 91 filled with contents and each having a top forming tubular portion 92 generally square in cross section for heating seal parts of the top forming portion with hot air which parts are to be heat-sealed. The heater comprises a hot air nozzle 93 in the form of a bottomed tube having a generally square cross section and to be inserted into the top forming portion 92 for heating. The hot air nozzle 93 has first to fourth four side walls 94 integral with one another with a ridgeline formed between the adjoining side walls. The side walls 94 are vertical and formed with orifices 95 as distributed over the regions thereof corresponding to the respective seal parts.

With the conventional heater, hot air is forced out from the nozzle 93 against the seal portions to heat these portions, whereupon the air changes its course, partly turning upward to flow out of the container 91. The rest of the air flows downward in the interior of the container. The downward flow of hot air forces up a portion of the liquid filled in the container which portion has been bubbled up when the liquid is placed into the container. Such bubbles will then adhere to the bottom surface of the nozzle 93 and will be scorched with the heat of the nozzle 93 to form an accumulation. The accumulation falls off from time to time and becomes incorporated into the contents, affording an unacceptable product.

The adhesion of bubbles can be obviated by reducing the rate of discharge of hot air, but an impaired heat pattern will then result to produce faulty seals.

SUMMARY OF THE INVENTION

An object of the present invention is to provide a heater for top portions of containers which is free of the likelihood that the hot air discharged from a nozzle will force up bubbles of the liquid filled in the container so as to obviate the adhesion of bubbles to the nozzle.

The present invention provides a heater for top portions of containers filled with contents and each having a top forming tubular portion generally rectangular to square in cross section for heating seal parts of the top forming portion with hot air for heat-sealing, the heater comprising a hot air nozzle in the form of a bottomed tube having a generally rectangular to square cross section and to be inserted into the top forming portion for heating, the hot air nozzle having first to fourth four side walls integral with one another with a ridgeline formed between the adjoining side walls, the side walls being formed with orifices as distributed over regions thereof corresponding to the respective seal parts, the side walls each having an outer surface facing obliquely upward.

With the heater embodying the present invention, each of the side walls has an outer surface facing obliquely upward, so that the hot air discharged from the nozzle is forced against the seal parts obliquely upward. Consequently, the hot air almost entirely flows upward after striking against the seal parts and is discharged from the container. The hot air discharged from the nozzle is therefore unlikely to force up bubbles of the liquid filled in the container, and the adhesion of bubbles to the nozzle can be obviated.

Preferably, the top forming portion has first to fourth four quadrilateral top panels divided from a trunk of the container by a horizontal score, integral with one another with a ridgeline formed between the adjoining panels and corresponding to the first to fourth side walls respectively, the top forming portion being prefolded to the shape of a gabled roof by folding the first and third top panels between the second and fourth top panels to an inwardly projecting form approximately V-shaped in cross section, with the second and fourth top panels so folded as to lap over the folded first and third top panels, the top forming portion being subsequently freed from the prefolded state, whereby the first and third top panels are inwardly inclined to position upper ends thereof closer to each other, and the second and fourth top panels are inwardly inclined to position upper ends thereof closer to each other, the first to fourth side walls being equal to or greater than the respective corresponding first to fourth top panels in angle of inclination.

In the case where hot air is forced against the top forming portion having first to fourth top panels which are inwardly inclined by prefolding, the hot air tends to be flowing inwardly of the container, whereas when the first to fourth side walls are equal to the respective corresponding first to fourth top panels in angle of inclination, the clearance between the first to fourth side walls and the first to fourth top panels corresponding thereto respectively is constant. Alternatively if the side walls are greater than the panels in angle of inclination, the clearance increases from portion to portion upward. In either case, the hot air can be discharged from the container smoothly and efficiently.

Preferably, the first and third side walls corresponding to the respective first and third top panels are 10 to 16 deg in the angle of inclination with respect to a vertical line, and the second and fourth side walls corresponding to the respective second and fourth top panels are 2 to 6 deg in the angle of inclination with respect to a vertical line.

If the angle of inclination of the top panels is too small, the hot air will not be discharged from the container effectively, whereas if the angle is excessively great, the seal portions will not be heated with the hot air effectively.

DESCRIPTION OF THE PREFERRED EMBODIMENT

Figure 1:
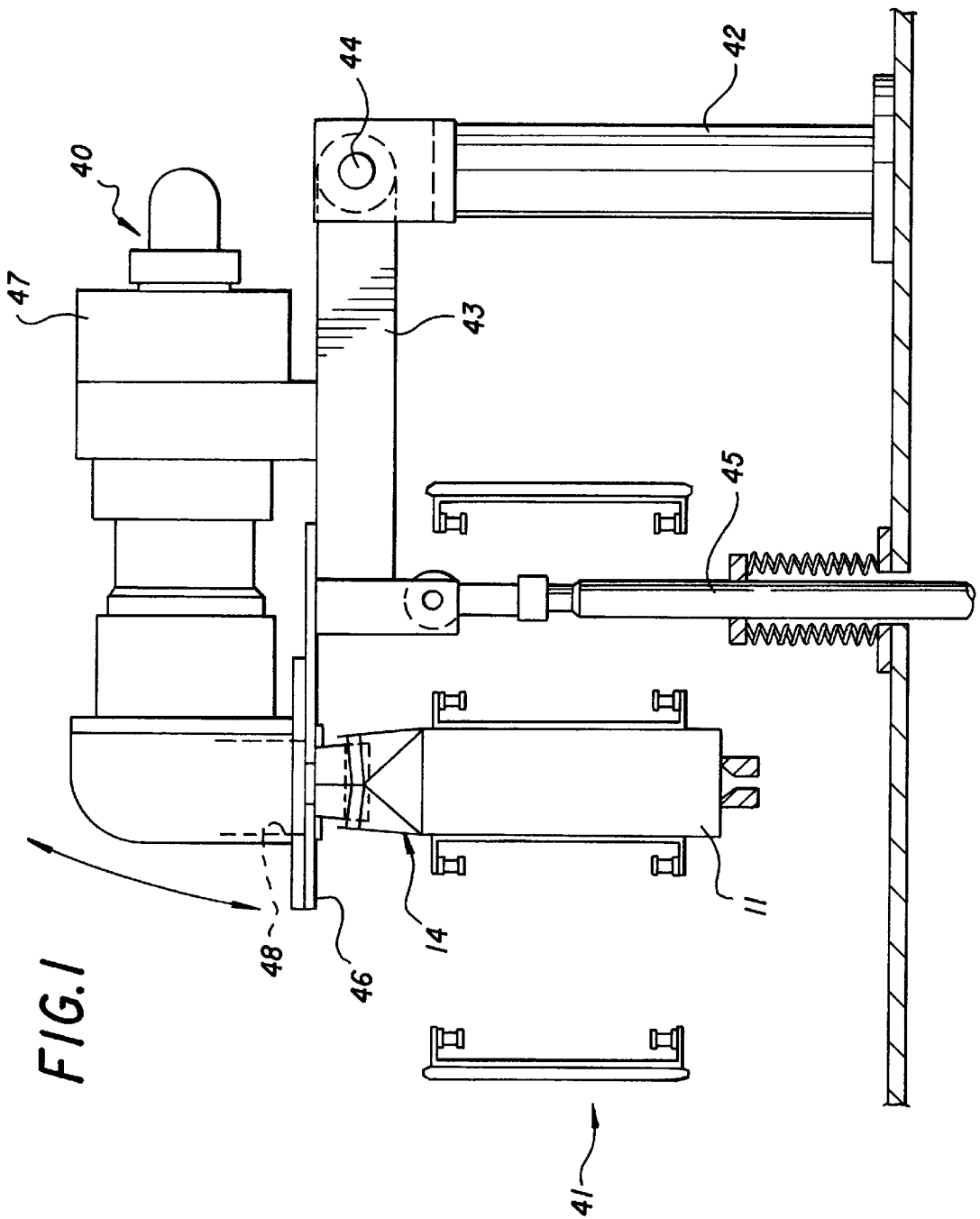
FIG. 1 is a front view of heater embodying the invention.

An embodiment of the invention will be described below with reference to the drawings.

In the following description, the terms "front" and "rear" are based on FIG. 1; with respect to a direction perpendicular to the plane of the drawing, one side of the plane closer to the viewer will be referred to as the front, and the other side away from the plane as the rear. The terms right and left are used when the illustration is seen from the front (thus, referring respectively to the right-hand side and the left-hand side of FIG. 1).

Figure 2:
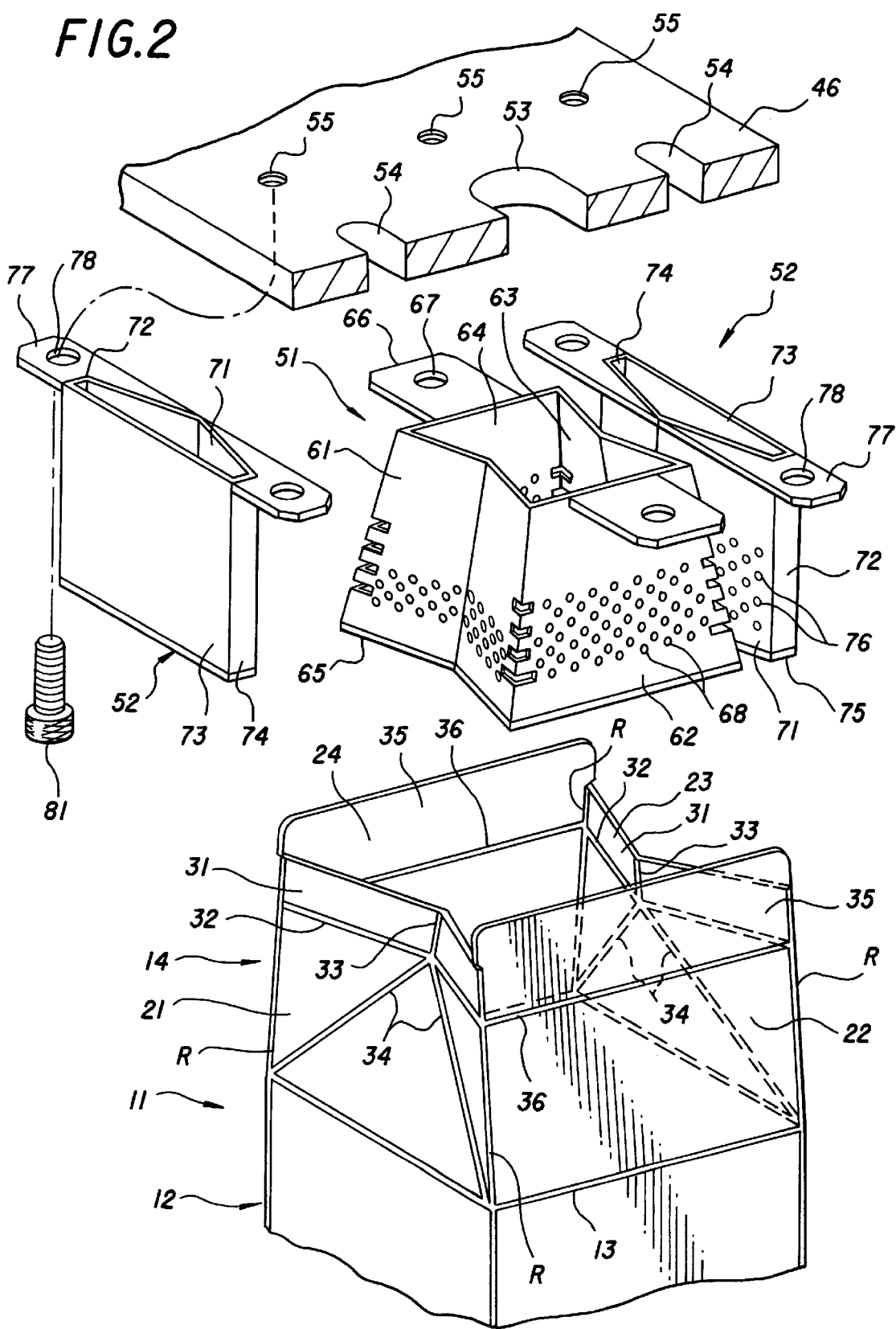
FIG. 2 is an exploded perspective view showing the main components of the heater along with a container.

FIG. 2 shows the upper portion of a container 11. The container 11 is prepared from a paper-base laminate having a polyethylene layer over each of the inner and outer surfaces, and is in the form of a bottomed tube rectangular to square in cross section. The container 11 comprises a trunk forming portion 12 having a quadrilateral horizontal section, and a top forming portion 14 extending from the upper end of the portion 12 with an endless lower horizontal score 13 formed therebetween. The top forming portion 14 is prepared by being prefolded to the shape of a gabled roof and thereafter freed from the prefolded state. The container 11 has already been filled with contents. The container has an illustrated bottom forming portion which is folded flat and closed.

The top forming portion 14 has four quadrilateral top panels integral with one another with a ridgeline R formed between the adjoining panels, i.e., a first top panel 21 facing to the front, second top panel 22 facing rightward, third top panel 23 facing rearward and fourth top panel 24 facing leftward.

The first top panel 21 has an upper horizontal score 32 partitioning the panel into a striplike seal part 31 toward its upper end and the other portion, a vertical score 33 extending upward from the midpoint of length of the score 32 across the seal part 31, and two oblique scores 34 extending obliquely downward in directions opposite to each other from the lower end of the vertical score 33 to opposite ends of the portion of the lower score 13 defining the panel 21. The second top panel 22 is formed with an upper horizontal score 36 joined to the upper horizontal score 32 of the first top panel 21 and partitioning off a seal part 35. The third top panel 23 has the same structure as the first top panel 21. The fourth top panel 24 has the same structure as the second top panel 22.

In prefolding the container, the first and third top panels 21, 23 are folded between the second and fourth top panels 22, 24 to an inwardly projecting form approximately V-shaped in cross section, with the second and fourth top panels 22, 24 so folded as to lap over the folded first and third top panels 21, 23. As the result of folding, the seal parts 31 of the first and second top panels 21, 23 are folded in two each along the vertical score 33 on the front and rear sides of the container, whereby each seal part 31 has its outer surface fitted over itself. On the right and left sides, the inner surfaces of the seal parts 35 of the second and fourth top panels 22, 24 are fitted over both the inner surfaces of the folded seal parts 31. The lapping or fitted parts are the seal portions to be heated.

The top forming portion 14 of the container 11 is square in horizontal section before the prefolding. When freed from the folded state after the prefolding, the top forming portion 14 acts to restore itself to the original shape owing to the springback of the container material, whereas the tendency toward the folded state imparted by the prefolding prevents the portion 14 from reverting to the original form completely. Consequently, the first and third panels 21, 23 are inwardly inclined to position upper ends thereof closer to each other, and the second and fourth top panels 22, 24 are inwardly inclined to position upper ends thereof closer to each other as shown in FIG. 2. The upper portions of the first and third top panels 21, 23 including the respective seal parts 31 are inwardly recessed so as to be V-shaped in horizontal section. On the other hand, the second and fourth top panels 22, 23 remain substantially flat.

FIG. 1 shows a heater 40 and a container conveyor 41. It is seen that the container 11 is brought to the location of the heater 40 with its first top panel 21 facing toward the front.

A stand 42 in the form of a vertical post is provided on the right side of the path of transport of containers. A pivotal member 43 movable upward and downward is supported at its right end by a horizontal pin 44 on the upper end of the stand 42, the pin 44 extending in the front-to-rear direction. The pivotal member 43 has a left end connected to the upper end of a retractable rod 45. The rod 45 is advanced or retracted axially thereof while being pivotally moved along with the pivotal member 43 by an unillustrated fluid pressure cylinder. A nozzle mount plate 46 is attached to the left end of the pivotal member 43 in a cantilever manner so as to be projected to a position above the path of transport of the container. Installed on the pivotal member 43 is the main body 47 of the heater 40 extending from a lengthwise intermediate portion of the pivotal member 43 to a position above the nozzle mount plate 46. The heater main body 47 has a hot air outlet 48 facing downward and opposed to the upper side of the nozzle mount plate 46. Attached to and depending from the lower side of the nozzle mount plate 46 are a container inside heating nozzle 51 and two container outside heating nozzles 52 (see FIG. 2).

With reference to FIG. 2, the nozzle mount plate 46 is formed with a large hot air supply hole 53 in the midportion thereof with respect to the front-to-rear direction, and two small hot air supply holes 54 at the front and rear sides the hole 53. The large and small holes 53, 54 are each in the form of an oblong circle elongated in the right-to-left direction, and are in communication with the hot air outlet 48 although not shown in detail. Screw holes 55 are formed in the mount plate 46 at right and left sides of the holes 53, 54 (only left holes 55 shown).

The two container outside heating nozzles 52 are positioned respectively on the front and rear sides of the container inside heating nozzle 51, with a clearance formed between each nozzle 52 and the nozzle 51 for permitting insertion of the container upper end.

The container inside heating nozzle 51 is in the form of a tube generally rectangular to square in horizontal section and having an open upper end in communication with the large hot air supply hole 53. The nozzle 51 comprises a first side wall 61 facing to the front, second side wall 62 facing rightward, third side wall 63 facing rearward and fourth side wall 64 facing leftward which are integral with one another with a ridgeline formed between the adjoining walls, and has a horizontal flat bottom wall 65.

The first to fourth side walls 61 to 64 are trapezoidal when viewed face-to-face, and are each so inclined that the outer surface thereof faces obliquely upward. With the nozzle 51 inserted in the container 11, the first to fourth side walls 61 to 64 are opposed respectively to the first to fourth top panels 21 to 24.

The first side wall 61 is V-shaped in horizontal section so as to be positioned along the V-shaped seal part 31 of the first top panel 21. The angle of V made by the first side wall 61 remains constant from upper end to lower end. The second side wall 62 is flat in its entirety. The third side wall 63 has the same structure as the first side wall 61. The fourth side wall 64 has the same structure as the second side wall 62. A lug 66 having a bolt hole 67 is provided at the midportion of upper edge of each of the second and fourth side walls 62, 64.

The first to fourth side walls 61 to 64 each have a lower portion formed with a multiplicity of orifices 68 as distributed generally in a staggered arrangement. The ridgeline portions between the adjoining first to fourth side walls 61 to 64 are also formed with orifices, which are each in the form of horizontal slit. The other orifices 68 are circular bores perpendicular to the wall.

The front and rear outside heating nozzles 52 are directed in opposite relation to each other with respect to the front-to-rear direction, but have the same construction. The rear nozzle 52 will be described below.

The container outside heating nozzle 52 is in the form of a tube having a rectangular horizontal section and a thickness in the front-to-rear direction, and has an open upper end in communication with the small hot air supply hole 54. The nozzle 52 comprises a first side wall 71 facing to the front, second side wall 72 facing rightward, third side wall 73 facing rearward and fourth side wall 74 facing leftward which are integral with one another with a ridgeline formed between the adjoining walls, and has a horizontal flat bottom wall 75.

The first to fourth side walls 71 to 74 are rectangular when viewed face-to-face and vertical. The first side wall 71 has a forwardly projecting form V-shaped in horizontal section in conformity with the third side wall 63 of the inside heating nozzle 51. The first side wall 71 has a lower portion formed with a multiplicity of orifices 76. The second to fourth side walls 72 to 74 are all flat. Except for the third side wall 73, the first, second and fourth side walls 71, 72, 74 are provided at their upper ends with a flange 77 which is elongated in the right-to-left direction and has a bolt hole 78 at each of its opposite ends.

Bolts 81 are inserted through the bolt holes 67 of the inside heating nozzle 51 and screwed into the corresponding screw holes 55, and other bolts 81 are inserted through the bolt holes 78 of the outside heating nozzles 52 and screwed into the corresponding screw holes 55, whereby the inside heating nozzle 51 and the outside heating nozzles 52 are attached to the nozzle mount plate 46.

Figure 3:
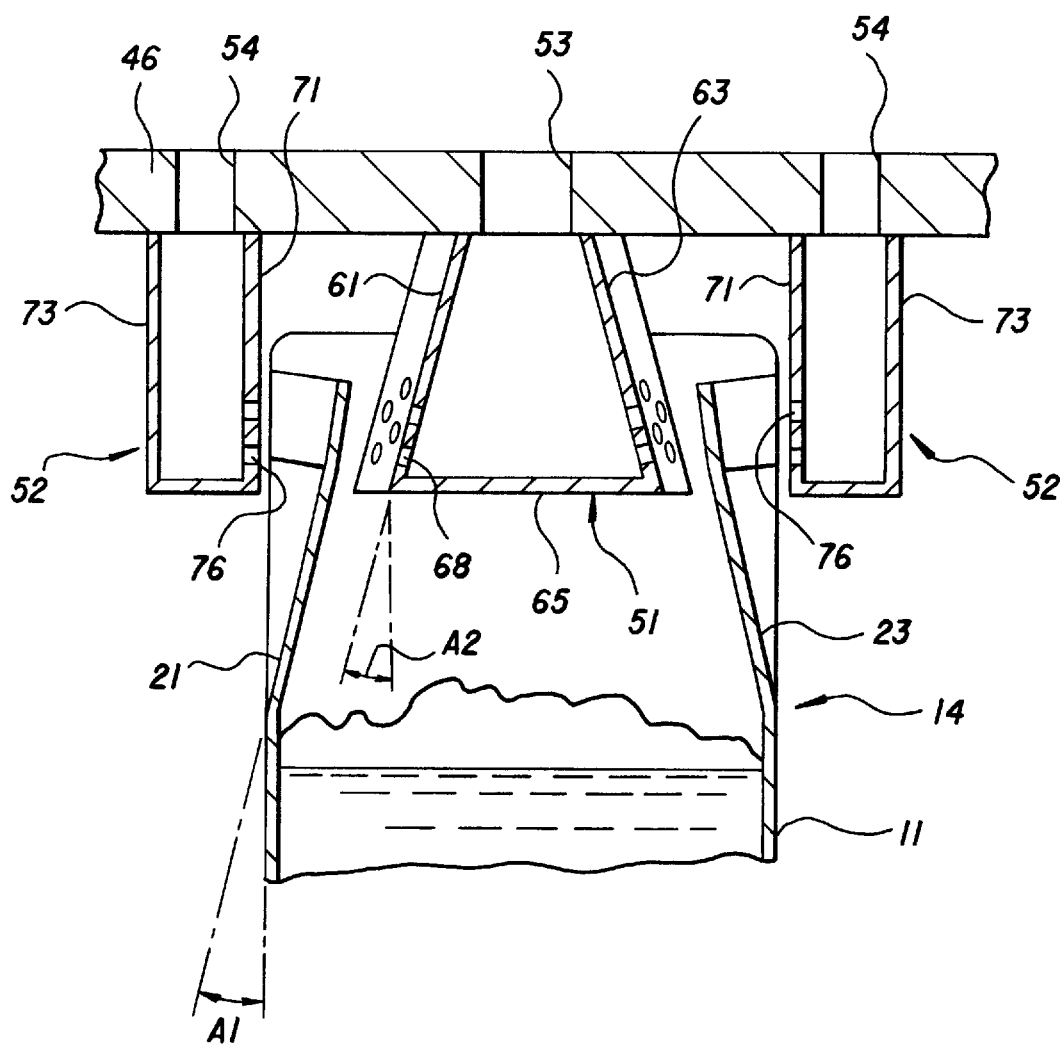
FIG. 3 is a sectional view schematically showing the heater in hot air discharging operation as it is seen from one side.
Figure 4:
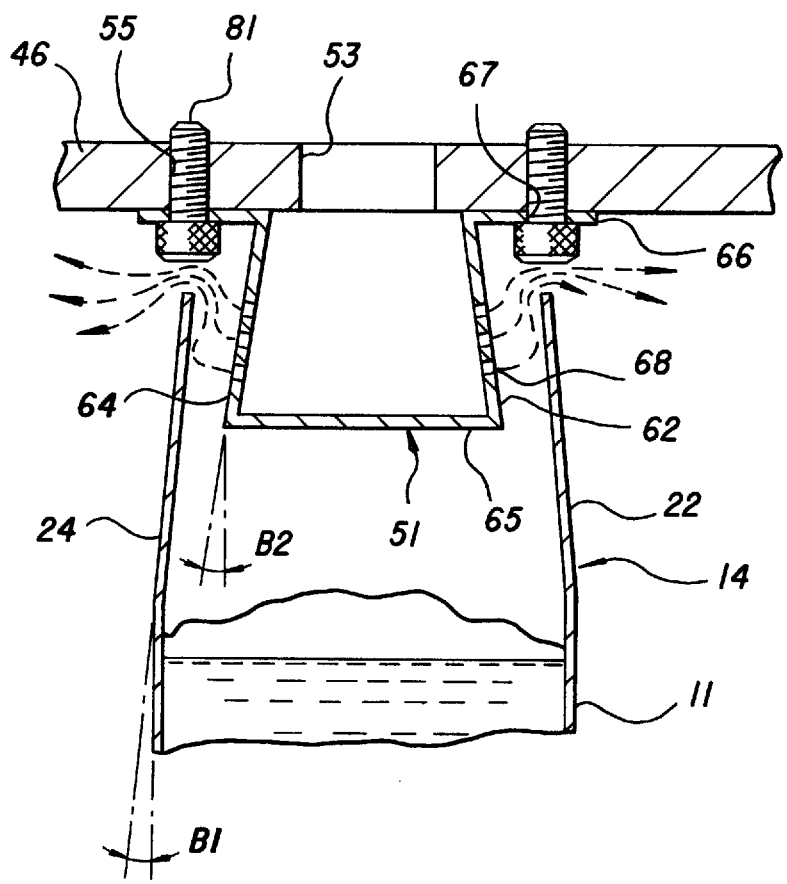
FIG. 4 is a sectional view schematically showing the heater in hot air discharging operation as it is seen from the front.
Figure 5:
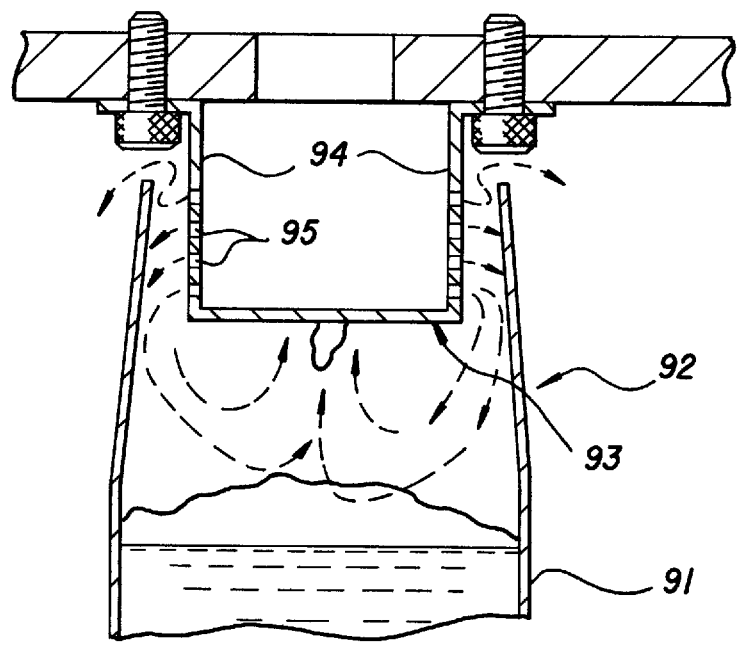
FIG. 5 is a sectional view corresponding to FIG. 4 and showing a conventional heater.

FIGS. 3 and 4 schematically show the position of the top forming portion 14 relative to the nozzles 51, 52. FIG. 3 shows in section the midportions of first and third top panels 21, 23 of the top forming portion between the right and left ends thereof. At the midportions, these panels 21, 23 are maximum in the angle of inclination, and the angle gradually decreases from portion to portion toward right and left. The maximum angle of inclination A1 is about 13 deg with respect to a vertical line. (The drawing shows the angle as exaggerated.) FIG. 3 also shows in section the midportions of first and third side walls 61, 63 of the container inside heating nozzle 51 between the right and left ends thereof. These walls 61, 63 have a constant angle of inclination over the entire width between the right and left ends. This angle A2 is about 14 deg with respect to a vertical line. (The drawing shows the angle as exaggerated.)

The maximum angle of inclination A1 of the first and third top panels 21, 23 is actually in the range of about 10 to 16 deg although varying depending on the degree of prefolding. To accommodate the first and second side walls 61, 63 of the nozzle 51 to the variation, the angle of inclination A2 thereof is made equal to, or greater than, the angle A1 of the first and third top panels 21, 23, i.e., $A1 \leq A2$.

FIG. 4 shows the relationship between the second and fourth top panels 22, 24 of the top forming portion 14 and the second and third side walls 62, 64 of the nozzle 51. The angle of inclination B1 of the second and fourth top panels 22, 24 with a vertical line is 3 deg, while the angle of inclination B2 of the second and fourth side walls 62, 64 is 4 deg. When this case is considered also in actuality, the angle B1 of the second and fourth top panels 22, 24 is 2 to 6 deg. As is the case with FIG. 3, the angles are so determined that $B1 \leq B2$.

If the angles A2, B2 of the first to fourth side walls 61 to 64 of the nozzle 51 are made equal to the respective angles A1, B1 of the first to fourth top panels 21 to 24 of the top forming portion 14, the horizontal clearance between the first to fourth top panels 21 to 24 and the respective first to fourth side walls 61 to 64 corresponding thereto is constant from top to bottom. Further when the angles A2, B2 of the side walls 61 to 64 are made greater than the respective angles A1, B1 of the top panels 21 to 24, the clearance increases from portion to portion upward.

When the container 11 is transported to and halted at the location of the heater 40, the heater 40 in a raised standby position is brought to a lowered position shown in FIG. 1, whereupon the inside heating nozzle 51 is inserted into the container 11, and the front and rear outside heating nozzles 52 are positioned as opposed to the respective first and third top panels 21, 23 of the container 11. The inner surfaces of the seal parts 31, 35 of the first to fourth top panels 21 to 24 are heated with hot air discharged from the orifices 68 of the inside heating nozzle 51, and the outer surfaces of the seal parts 31 of the first and third top panels 21, 23 are heated with hot air discharged from the orifices 76 of the front and rear outside heating nozzles 52.

Since the side walls 61 to 64 of the inside heating nozzle 51 face obliquely upward, the hot air to be discharged from the orifices 68 of the nozzle 51 is forced out also obliquely upward. The hot air forced out obliquely upward flows straight, striking against the inner surfaces of the seal parts 31, 35 from a lower position obliquely upward, then flows upward along the inner surfaces of the seal parts 31, 35 and thereafter flows out from the container 11. Accordingly there is no likelihood of the hot air flowing downward into the container. The hot air can be discharged from the container 11 smoothly also because the clearance between the container 11 and the nozzle 51 is so determined as described above.

What is claimed is:

1. A heater for top portions of containers filled with contents and each having a top forming tubular portion generally rectangular to square in cross section for heating seal parts of said top forming portion with hot air for heat-sealing, said heater comprising:

a hot air nozzle which is a bottomed tube having a generally rectangular to square cross section and to be inserted into said top forming portion for heating, said hot air nozzle having first, second, third, and fourth side walls integral with one another with a ridgeline formed between adjoining side walls, said first, second, third, and fourth side walls being formed with orifices as distributed over regions thereof corresponding to respective seal parts, said first, second, third, and fourth side walls each having an outer surface facing obliquely upwardly, wherein said outer surface facing obliquely upwardly allows hot air discharged from said nozzle to be forced against said respective seal parts in an obliquely upwardly direction so that said hot air almost entirely flows upwardly after striking against said respective seal parts and said hot air is then discharged from said container so that said hot air is unlikely to force up bubbles of said contents filled in said container and thus, adhesion of said bubbles to said nozzle can be prevented.

2. The heater as defined in claim 1, wherein said top forming portion having first, second, third, and fourth quadrilateral top panels divided from a trunk of said container by a horizontal score, integral with one another with a ridgeline formed between adjoining panels and corresponding to said first, second, third, and fourth side walls, respectively, said top forming portion being prefolded to a shape of a gabled roof by folding said first and third top panels between said second and fourth top panels to an inwardly projecting form approximately V-shaped in cross section, with said second and fourth top panels being so folded as to overlap said first and third top panels, once said first and third top panels have been folded, said top panel being subsequently freed from a prefolded state, whereby said first and third top panels are inwardly inclined to position upper ends thereof closer to each other, and said second and fourth top panels are inwardly inclined to position upper ends thereof closer to each other, said first and fourth side walls being any one of equal to and greater than corresponding first and fourth top panels, respectively, in angle of inclination.

3. The heater as defined in claim 2, wherein said first and third side walls corresponding to said first and third top panels, respectively, are 10 to 16 degrees in said angle of inclination with respect to a vertical line, and said second and fourth side walls corresponding to said second and fourth top panels, respectively, are 2 to 6 degrees in said angle of inclination with respect to a vertical line.

4. A heater for top portions of containers filled with contents and each having a top forming tubular portion generally rectangular to square in cross section for heating seal parts of said top forming portion with hot air for heat-sealing, said heater comprising:

a hot air nozzle which is a bottomed tube having a generally rectangular to square cross section and to be inserted into said top forming portion for heating, said hot air nozzle having first, second, third, and fourth side walls integral with one another with a ridgeline formed between adjoining side walls, said first, second, third, and fourth side walls being formed with orifices as distributed over regions thereof corresponding to respective seal parts, said first, second, third, and fourth side walls each having an outer surface facing obliquely upwardly;

said top forming portion having first, second, third, and fourth quadrilateral top panels divided from a trunk of said container by a horizontal score, integral with one another with a ridgeline formed between adjoining panels and corresponding to said first, second, third, and fourth side walls, respectively, said top forming portion being prefolded to a shape of a gabled roof by folding said first and third top panels between said second and fourth top panels to an inwardly projecting form approximately V-shaped in cross section, with said second and fourth top panels being so folded as to overlap said first and third top panels, once folded, said top panel being subsequently freed from a prefolded state, whereby said first and third top panels are inwardly inclined to position upper ends thereof closer to each other, and said second and fourth top panels are inwardly inclined to position upper ends thereof closer to each other, said first and fourth side walls being any one of equal to and greater than corresponding first and fourth top panels, respectively, in angle of inclination; and said first and third side walls corresponding to said first and third top panels, respectively, are 10 to 16 degrees in said angle of inclination with respect to a vertical line, and said second and fourth side walls corresponding to said second and fourth top panels, respectively, are 2 to 6 degrees in said angle of inclination with respect to a vertical line.

* * * * *